United States Patent [19]

Möller et al.

[11] Patent Number: 5,749,562
[45] Date of Patent: May 12, 1998

[54] MODULAR VALVE ARRANGEMENT

[75] Inventors: Rudolf Möller, Gehrden; Peter Müller, Hanover, both of Germany

[73] Assignee: Mannesmann Aktiengesellschaft, Düsseldorf, Germany

[21] Appl. No.: 621,846

[22] Filed: Mar. 25, 1996

[30] Foreign Application Priority Data

Mar. 24, 1995 [DE] Germany .................. 195 12 263.1

[51] Int. Cl.⁶ ........................................ F16K 31/44
[52] U.S. Cl. ............................... 251/367; 251/271
[58] Field of Search ............................. 251/367, 271

[56] References Cited

U.S. PATENT DOCUMENTS

| | | | |
|---|---|---|---|
| 3,698,432 | 10/1972 | Kutz | 137/271 |
| 3,707,989 | 1/1973 | Jullien-Davin | 137/271 |
| 3,934,605 | 1/1976 | Legris | 137/271 |
| 4,095,864 | 6/1978 | Hardin | 137/269 |
| 4,247,133 | 1/1981 | Möller | 137/271 |
| 4,524,807 | 6/1985 | Toliusis | 137/269 |
| 5,025,834 | 6/1991 | Stoll | 137/271 |

Primary Examiner—A. Michael Chambers
Attorney, Agent, or Firm—Cohen, Pontani, Lieberman & Pavane

[57] ABSTRACT

A modular valve arrangement, including: a plurality of individual values each having a passage therein with a longitudinal axis, and a fixing arrangement for joining the valves together into a joined condition in which the passages cooperate to form at least one pressure-fluid line through the entire valve arrangement. The fixing arrangement includes, for each valve, a dovetail tenon on one surface of the valve and a dovetailed mortise on an opposite surface of the valve. The mortise and tenon of adjacent valves being engageable with one another in the joined condition, and extending on their respective valve side in a direction perpendicular to a longitudinal axis of the pressure-fluid line. For securing the valves in the joined condition, each valve includes a nub on one surface and a corresponding depression on an opposite surface of the valve arranged so that the nub of one valve engages the depression of an adjacent valve in the joined condition.

8 Claims, 1 Drawing Sheet

MODULAR VALVE ARRANGEMENT

BACKGROUND OF THE INVENTION

1. Field of the Invention

The present invention relates to a modular valve arrangement consisting of individual valves which can be joined together by fixing elements. In an assembled condition, at least one pressure-fluid line extends through the entire valve arrangement.

2. Description of the Prior Art

A valve arrangement of this type is known from German reference DE 28 52 685 A1. In that known valve arrangement, which is referred to as a valve battery, all features of this type of arrangement can be found. However, in this known valve arrangement, the valves are arranged on base-plate elements. The base-plate elements themselves are provided with fixing elements and can be joined to each other so that the individual valves are connected together by joining together the base-plate elements. Pressure-fluid lines are arranged in the base-plate elements so that, upon joining together the base plate elements, the fluid lines extend through the entire joined base-plate arrangement.

Thus, the prior art teaches an advantageous combining of the pressure-fluid lines for the valves which can be placed on the base-plate elements. Furthermore, the valves can be removed from such a valve arrangement without having to take the entire valve battery or valve arrangement apart. In this connection it is merely necessary to apply a suitable closure element at the place where a valve has been removed.

However, in manufacturing and in assembling on site, a large number of individual parts constitutes a considerable disadvantage of this prior art design.

German reference DE 29 24 321 C2 discloses a valve arrangement in which the individual valves are connected by fixing elements which consist of dovetail tenons and dovetailed mortises.

SUMMARY OF THE INVENTION

Accordingly, it is an object of the present invention, to provide a valve arrangement that, on the one hand, has fewer parts than prior art devices and, on the other hand, permits the removal of individual valves from a complete valve arrangement without the valve arrangement having to be completely taken apart.

Pursuant to this object and others which will become apparent hereafter, one aspect of the present invention resides in a valve arrangement in which the fixing elements are arranged directly on the valve. Each valve also has a dovetail tenon and a dovetailed mortise arranged on facing sides of the valve housing so that the resultant direction of joinder of the fixing elements is substantially perpendicular to the longitudinal axis of the pressure-fluid line. Each valve contains stop elements which, after the insertion of the dovetail elements in one another, secure the assembled condition. The stop elements include nubs arranged on one connecting surface of each valve and holes or depressions on the corresponding other connecting surface of each valve.

The fixing elements, contrary to the aforementioned prior art, are no longer pure detent elements but rather joining elements in the dovetail configuration. The alignment of the direction of the joint, defined by the connected dovetail elements, perpendicular to the pressure-fluid line in permits removal of an individual valve from the entire valve arrangement without having to break apart the entire arrangement. Furthermore, the fixing elements are now arranged directly on the valve so that base-plate elements, as were required in the prior art, can be dispensed with.

By this complementary development, namely that a dovetail tenon is present on one of the surfaces of the valve and a dovetailed mortise is present on the other surface of each valve, there result fixing elements which, on the one hand, establish a direction of the joint in the indicated manner in accordance with the invention and, on the other hand, have an undercut so that there is an axial holding force between connected elements of adjacent values.

In a further embodiment, only one of the surfaces of the joint is provided with an annular seal which comes, in the assembled condition, in sealing contact against the surface which is without a sealing ring, which is obtained as a result of the dovetail fixing elements. In other words, stated briefly, only one of the surfaces need be provided with an annular seal.

In another embodiment of the invention, two or more valves can also have internal connections with each other with respect to the control air which may pass either through the entire valve arrangement or only part of it. In this way there is obtained a suitable possibility of functionally combining several valves and the possibility of a master coupled valve function.

As a further embodiment of the invention, holding elements are applied to the outer surfaces of the valve which face away from each other. The holding elements cooperate with a support rail for fastening the entire valve arrangement.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
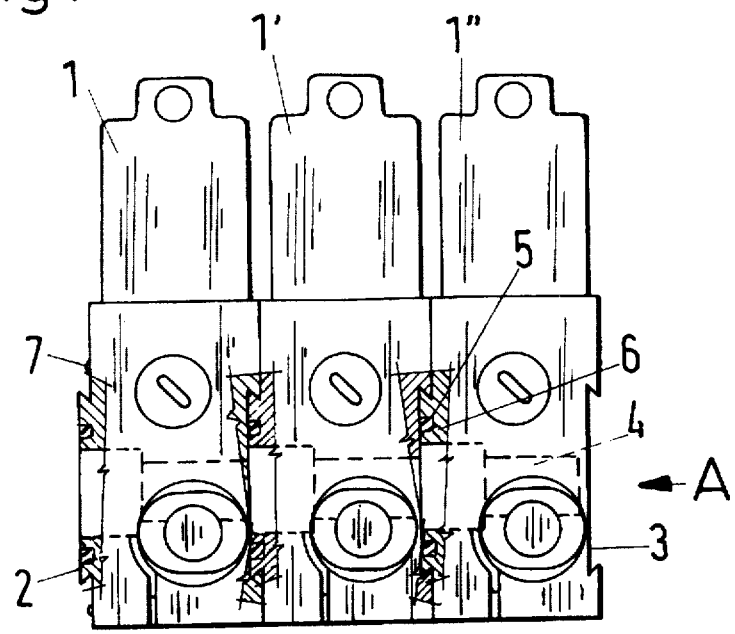
FIG. 1 is a front view of three valves placed together, pursuant to the present invention.

FIG. 1 shows three valves 1, 1' and 1" in accordance with the invention arranged in a row alongside of each other. Each of the valves is provided on one outer side with a dovetail tenon 2 and on an opposite outer side with a dovetailed mortise 3. In this way, it is possible to place the valves in a row one against the other since in each case the dovetail tenon 2 of a following valve engages into the dovetailed mortise 3 of the preceding valve. A continuous pressure line 4 is produced by connecting together the valves and is shown in dashed line. The dovetail tenons 2 and the dovetailed mortises 3 extend perpendicular to the view shown in FIG. 1. In other words, from the view in FIG. 1 the valves would be removed in the direction perpendicular to the plane of the paper, the dovetail tenon 2 and dovetailed mortise 3 extending in this direction. Thus, the direction of joinder in which the valves can be placed together is perpendicular to the resultant pressure line 4.

Each of the valves 1, 1', 1" ... is provided on the side on which the dovetail tenon 2 is arranged with a ring-shaped groove 6 around the opening of the pressure-line section 4. A sealing ring 5 is inserted in the groove 6. The opposite side of each valve, which is provided with the dovetailed mortise 3, does not have such a sealing ring. The sealing ring 5 on the dovetail tenon side is, however, designed so that it rests tightly against the bottom of the dovetailed mortise 3 and seals off the passage from one valve to the other.

In order to also secure the installed position after the pushing in of the valves over the dovetail joint elements, stop nubs 7 and corresponding stop holes 8 (FIG. 2) are provided. In this case, the nubs and holes are also arranged in the same complementary manner as the complementary arrangement of, in each case, one dovetail tenon and, opposite it, one dovetailed mortise per valve. Thus, for instance, on the side on which the dovetail tenon 2 is arranged, only the nubs 7 are provided and on the opposite side, which is provided with the dovetailed mortise 3, the holes 8 are arranged in a corresponding position to receive the nubs 7 of successive valves. These holes 8 are positioned with respect to each other so that upon pushing in the valves over the dovetail joint elements, when the desired position is reached, the nubs 7 engage, fixed in position, in the holes 8. The nubs 7 and the holes 8 are, however, developed so that there is a dependable fixing in position of the valves, but also so that the forces which are necessary in order to be able to remove an individual valve from, for instance, an entire battery of valves, are not insurmountable. Additionally, assurance is to be present that one or more valves of an entire valve battery can be readily removed without having to break apart the entire valve battery.

By this dependable guidance and fixing of the valves by the dovetail joint elements and the stop elements as well as the arrangement of the seal, there is made possible, on the one hand, a simple mounting and, on the other hand, a reliable sealed passage of pressure lines. In this connection it is possible to either only pass the pressure-fluid supply line 4 through or to also pass other pressure lines through at least partially or, relative to the assembled valve battery, in sections. It is also possible to conduct electric lines through ducts which can be passed through or interconnected. Furthermore, it can be provided that certain valves of a valve battery which are inserted at a given place in the valve battery form a branching of one or more pressure-fluid lines which are passed through. In this way, either all or at least a predominant part of lines which otherwise would have to be brought in or tapped off from the outside are dispensed with. By the ability to connect different pressure lines and the branching of them as well as by the possibility of also being able to effect control-air couplings between at least two valves, it is possible with the present invention to couple several valves together to form a master distributing valve function.

Figure 2:
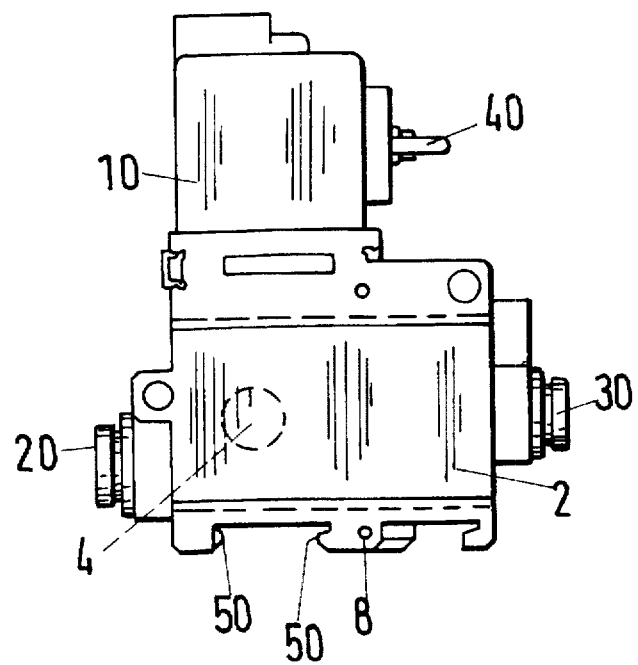
FIG. 2 is a side view of a valve pursuant to the present invention.

FIG. 2 shows a side view of one of the valves pursuant to the present invention, in the direction of the arrow A in FIG. 1. In this view there can now be noted the dovetailed mortise 3 as well as the arrangement of the pressure-fluid line 4. There is not shown in this figure the arrangement of the sealing ring 5, which may be of any desired type but must always be so designed that the pressure-fluid lines are sealed off with respect to each other from the outside as soon as the valves are connected with each other. The position of the holes 8 for the reception of the nubs 7 is also shown. The valves have further connections 20, 30, as well as an electric or electropneumatic drive 10. Electric connecting pins 40 serve for actuating or controlling of the valves.

On the bottom of the valve, fastening elements 50 are provided which permit the assembled valve battery to be fastened on a mounting element, such as a support rail.

The invention is not limited by the embodiments described above which are presented as examples only but can be modified in various ways within the scope of protection defined by the appended patent claims.

We claim:

1. A valve, comprising:

a valve body having a front, a back and two oppositely directed sides;

a dovetail tenon arranged on a first of the sides so as to run from the front to the back;

a dovetailed mortise provided in a second of the sides so as to run from the front to the back;

a through passage perpendicular to the tenon and the mortise;

a nub provided on one of the sides; and a depression provided in the other of the sides so as to correspond to the nub.

2. A modular valve arrangement, comprising:

a plurality of individual values, each of the values having a passage therein with a longitudinal axis;

fixing means for joining the valves together into a joined condition in which the passages cooperate to form at least one pressure-fluid line through the entire valve arrangement, the fixing means including, for each valve, a dovetail tenon on one surface of the valve and a dovetailed mortise on an opposite surface of the valve, a mortise and a tenon of adjacent valves being engageable with one another in the joined condition, the mortise and tenon extending on their respective valve side in a direction perpendicular to the longitudinal axis of the pressure-fluid line; and stop means for securing the valves in the joined condition, the stop means including, for each valve, a nub on one surface of the valve and a corresponding depression on an opposite surface of the valve arranged so that the nub of one valve engages the depression of an adjacent valve in the joined condition.

3. A modular valve arrangement according to claim 2, and further comprising, for each valve, an annular seal arrangement on one of the valve surfaces so as to extend around the passage and configured to rest in the joined condition tightly against the surface of an adjacent valve which does not have the seal arrangement.

4. A modular valve arrangement according to claim 3, wherein the seal arrangement includes an annular groove provided in the one valve surface and a seal member arranged in the groove.

5. A modular valve arrangement according to claim 2, wherein the continuous pressure-fluid line formed by the valves in the assembled condition is a pressure-fluid supply line.

6. A modular valve arrangement according to claim 2, wherein the plurality of valves includes at least two valves having a pressure-fluid-tight connection for a control-air line in a region of the fixing means.

7. A modular valve arrangement according to claim 2, and further comprising, for each valve, fastening means, on a surface perpendicular to the surfaces having the fixing means, for fastening valve arrangement onto a mount.

8. A modular valve arrangement according to claim 2, wherein the nub and the dovetail tenon are located on the same valve surface.

* * * * *